Dec. 26, 1922.

B. Y. MILLER.
X-RAY STEREOSCOPE.
FILED DEC. 12, 1921.

Inventor
Byron Y. Miller
by Wilkinson & Giusta
Attorneys

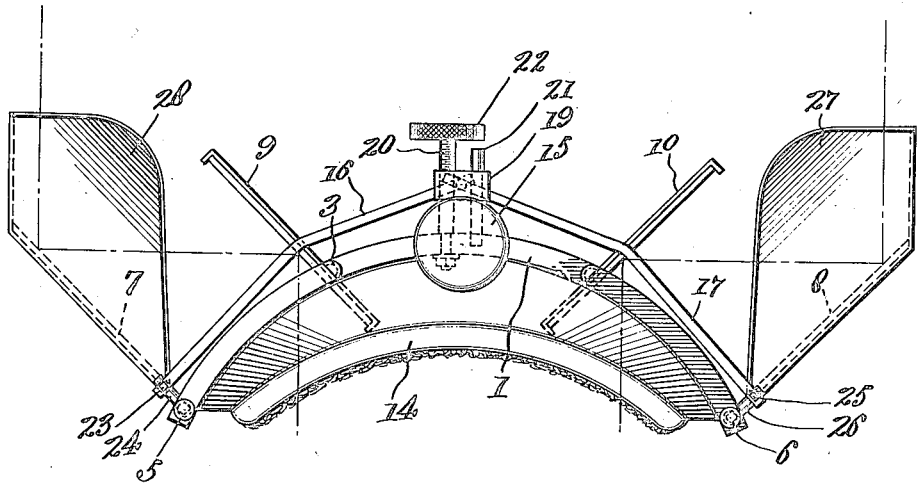

Patented Dec. 26, 1922.

1,440,231

UNITED STATES PATENT OFFICE.

BYRON YOUNG MILLER, OF SAN LUIS OBISPO, CALIFORNIA.

X-RAY STEREOSCOPE.

Application filed December 12, 1921. Serial No. 521,846.

*To all whom it may concern:*

Be it known that I, BYRON Y. MILLER, M. D., a citizen of the United States, residing at San Luis Obispo, in the county of San Luis Obispo and State of California, have invented certain new and useful Improvements in X-Ray Stereoscopes; and I do hereby declare the following to be a full, clear, and exact description of the invention, such as will enable others skilled in the art to which it appertains to make and use the same.

The present invention relates to improvements in X-Ray stereoscopes and relates more particularly to a hand stereoscope for use in viewing X-ray films.

An object of the invention is to provide a small, light hand stereoscope in which the mirrors are adjustable by easily and quickly shiftable means for viewing films at any desired angle, or distance.

Another object of the invention resides in providing an improved hand stereoscope of this character which will take up no appreciable room and can be used with any light box and used in connection with films directly in front of the device; or any angle up to right angle; and moreover being capable of employment in connection with films having two pictures thereon, and in connection with varying sizes of films and at various distances from the films.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a top edge view of an improved stereoscope constructed according to the present invention;

Fig. 3 is a bottom view of the device; and,

Fig. 4 is a vertical section taken on the line 4—4 in Fig. 1.

Figure 1:
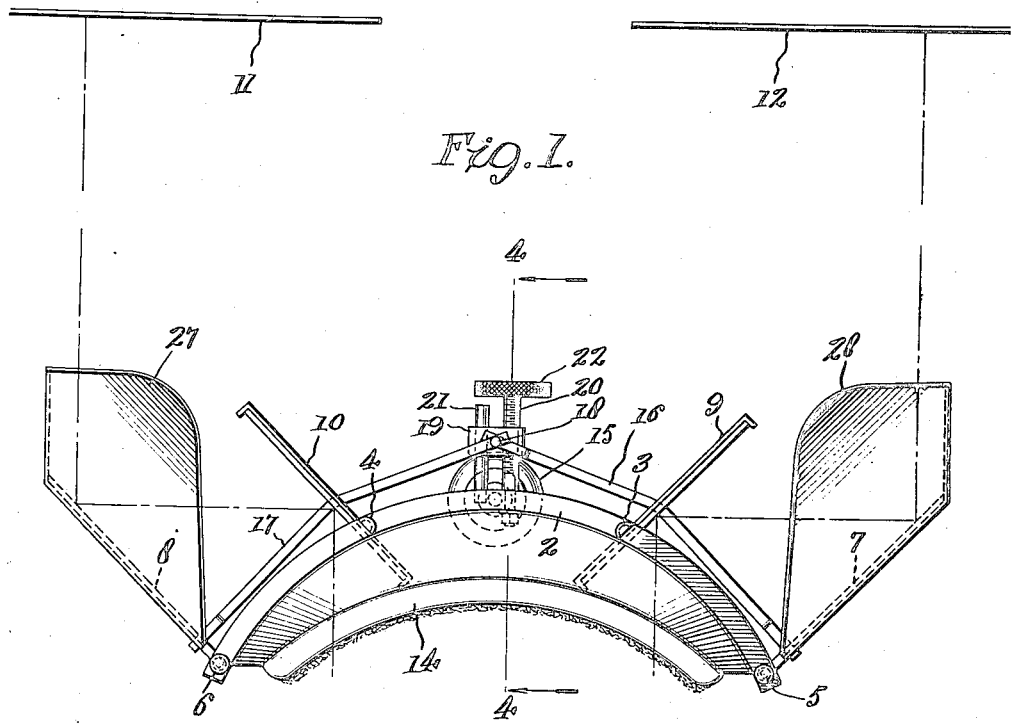
Figure 2:
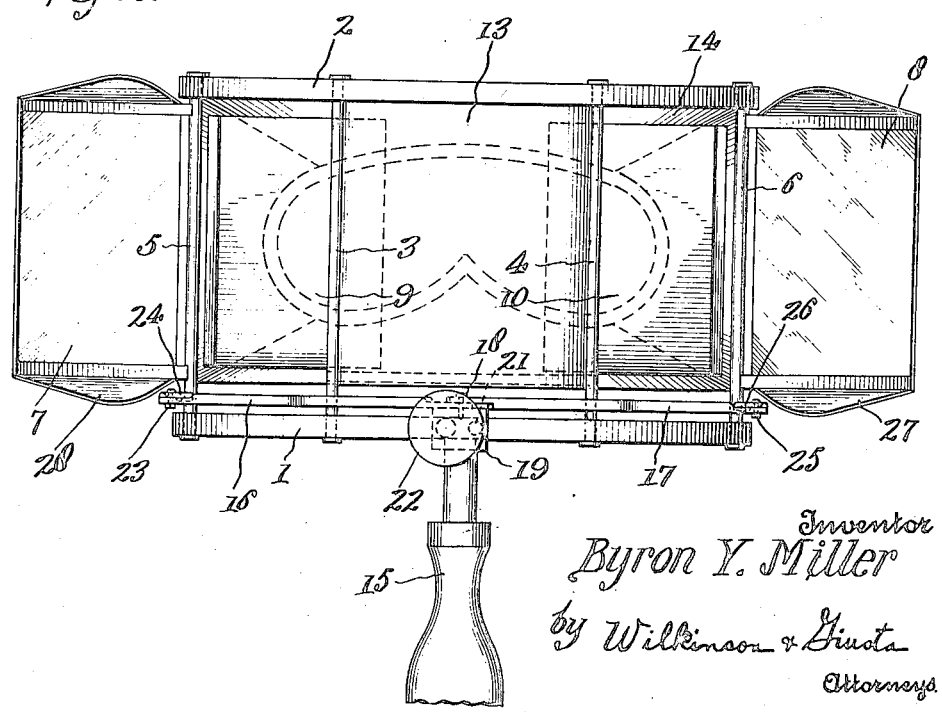
Fig. 2 is a front view thereof with a handle partly broken away.

Referring more particularly to the drawings, 1 and 2 designate upper and lower bars constituting in part the framework of the stereoscope and being of an arcuate form conforming substantially to the curvature of the face. These bars are connected by a pair of intermediate rods 3 and 4 and by end shafts 5 and 6. These latter shafts 5 and 6 carry mirrors 7 and 8 which rotate with the shafts 5 and 6 and permit of a variation in the angular relation of these mirrors with respect to a pair of stationary and complemental mirrors 9 and 10. The mirrors 7 and 9 at one side, and 8 and 10 at the other have mutually adjacent reflecting surfaces whereby light rays, for instance from the two films 11 and 12 indicated in Figs. 1 and 3, are directed to take the course indicated by the broken lines.

The mirrors 9 and 10 are secured respectively to the rods 3 and 4 by which they are rendered permanent and secured against turning. The bars 3 and 4 also support a blank wall 13 which precludes any light rays from getting to the eye of the beholder other than those coming in from the film sections 11 and 12.

A hood or shade 14 is carried by the framework of the device to take against the forehead and face of the user to avoid as much as possible the entry of the light beams from above and sides. The curvature given the device will take care of lateral shafts of light and will intercept them and avoid their impinging upon the eyes.

The device is supported in the hand by the use of a handle 15 which may if desired by removable from the frame to permit of setting the device in a holder. Adjacent this handle is a device for angularly adjusting the movable mirrors 7 and 8. This device consists of a pair of links 16 and 17 of a curved form as indicated in Figs. 1 and 3, the links being joined together and pivoted, as indicated at 18, upon a traveling nut 19 which is threaded to engage with a screw shaft 20 and is held against turning with the shaft 20 by the use of a pin 21 which fits slidingly through the nut 19. Both screw shaft 20 and pin 21 are suitably held upon the lower frame bar 1 of the device, the shaft 20 being free to rotate and being provided with a milled or other head 22 to facilitate its rotation.

The link 16 at its outer end is pivoted at 23 to an arm 24 secured to the shaft 5. In a similar manner a pivot point 25 connects the outer end of the companion link 17 to a like arm 26 fixed on the shaft 6.

Shades 27 and 28 are also provided in connection with the mirrors 7 and 8 to prevent interfering light beams from confusing the rays from the films.

In practice, the film 11 is taken from the angle at which the left eye would view the object, for instance the lungs of a patient, and the film 12 is taken from an opposite angle or from that at which the right eye, if it could penetrate the body, would view the barrel-like lungs. After these films have been so taken and developed, they are placed in front of a strong light in a lamp box and the stereoscope is applied in substantially the positions shown in Figs. 1 and 3 so that light rays emanating from the light source and passing through the films will take the course shown by the broken lines to the eyes of the viewer.

These light rays will first strike the mirrors 7 and 8 and will be deflected in accordance with laws governing angles of incidence and reflection, and will thereby be directed against the stationary mirrors 9 and 10 by which they are reflected in straight lines spaced apart separately to the right and left eyes of the user. The two images will blend in the brain in the usual way and form one composite picture and have a perspective or stereoscope effect.

It is often desirable in practice to place the films 11 and 12 or other pictures to be viewed at varying distances apart. This is permissable with the present device in that the angular positions of the outer mirrors 7 and 8 may be shifted in accordance with any change in location of the films. For instance if the films 11 and 12 are placed closer together, in that event the mirrors 7 and 8 may be swung toward one another and will then be in position to receive the full light rays from all parts of the films.

The film widths are slightly exaggerated in the drawings, it being remembered that the picture spaces thereon are of a smaller width, or in other words occupy only a partial width of the whole film strip. This drawing together of the mirrors is accomplished by the rotation of the screw shaft 20 to cause the nut 19 to move outwardly thereon. The movement of the shaft 20 will restore the nut 19 in the opposite direction and will cause the links 16 and 17 to push the mirrors 7 and 8 outwards and thus take care of the situation which occurs when the films 11 and 12 are separated a greater distance.

It will thus be seen that I have provided an improved stereoscope which may be placed on a shelf when not in use and will take up but little room thereon, and wherein the parts are few and simple and the assembled device light and compact and possessed of a wide range of focus, admitting of the quick and convenient adjustment of the outer mirrors for the purpose stated.

It is obvious that various changes and modifications may be made in the details of construction and design of the above specifically described embodiment of this invention without departing from the spirit thereof, such changes and modifications being restricted only by the following claims:

What is claimed is:

1. A stereoscope for use in viewing X-ray pictures comprising upper and lower curved bars, rods connecting said bars intermediately, rotary shafts journaled in the ends of the bars, mirrors connected to rotate with said shafts, other mirrors fixed upon said rods and co-operating with the first mentioned mirrors, arms upon said shafts, curved links pivotally coupled to said arms at one end, a sliding block held upon the lower bar to which the other two ends of said curved links are pivoted, and means engaging through said sliding block for moving the same and the connecting links whereby to vary the angular position of the first mentioned mirrors, substantially as described.

2. A stereoscope for viewing X-ray pictures comprising a frame work having means to support it and provided with a covering to fit about the eyes of the beholder, stationary mirrors lying in the line of sight and having their reflecting faces directed in opposite directions, other mirrors pivoted at the sides of said frame and disposed to divert light beams to the first mentioned mirrors, links having their outer ends coupled to said pivoted mirrors, sliding means upon the lower portion of the frame work coupled to the inner ends of said links, and an adjusting device for moving said means, substantially as described.

3. A stereoscope for viewing X-ray pictures comprising a frame having a handle to support it and a cover fitting about the eyes of the beholder, a pair of fixed mirrors in the line of sight, a second pair of mirrors pivoted at the side portions of the frame and adapted to divert light beams to the first mentioned mirrors, links coupled at their outer ends to said pivoted mirrors, a sliding block coupled to the inner ends of said links, means to support said block for sliding movement from the lower central portion of the frame near the handle, and a screw shaft passing through and having threaded engagement with said block for adjusting the same back and forth whereby to draw upon the links and angularly shift said pivoted mirrors, substantially as described.

BYRON YOUNG MILLER.